Dec. 8, 1959 A. M. ANGEL ET AL 2,916,624

PUNCHED TAPE READER

Filed Oct. 11, 1957 4 Sheets-Sheet 1

INVENTORS:
Arthur M. Angel
Howard Mangan

By Louis A. Kline
John T. Matlago
Their Attorneys

Dec. 8, 1959 A. M. ANGEL ET AL 2,916,624

PUNCHED TAPE READER

Filed Oct. 11, 1957 4 Sheets-Sheet 2

INVENTORS:
Arthur M. Angel
Howard Mangan

By Louis A. Kline
John J. Matlago
Their Attorneys

Dec. 8, 1959 A. M. ANGEL ET AL 2,916,624

PUNCHED TAPE READER

Filed Oct. 11, 1957 4 Sheets-Sheet 3

INVENTORS:
Arthur M. Angel
Howard Mangan

By Louis A Kline
John J. Matlago
Their Attorneys

Dec. 8, 1959 A. M. ANGEL ET AL 2,916,624

PUNCHED TAPE READER

Filed Oct. 11, 1957 4 Sheets-Sheet 4

INVENTORS:
Arthur M. Angel
Howard Mangan

By Louis A Kline
John J. Matlago
Their Attorneys

United States Patent Office 2,916,624

Patented Dec. 8, 1959

2,916,624

PUNCHED TAPE READER

Arthur M. Angel, Rolling Hills Estates, and Howard Mangan, Torrance, Calif., assignors to The National Cash Register Company, Dayton, Ohio, a corporation of Maryland Application October 11, 1957, Serial No. 689,504

7 Claims. (Cl. 250—219)

This invention relates to punched tape reading devices and more particularly to an optical reading head utilizing lenses for controlling the light rays passing through openings of the tape to obtain improved output signals.

In the computer art, record tapes are utilized for storing coded information by particular combinations of holes and the absence of holes arranged in rows disposed at right angles to the longitudinal axis of the tape, and arranged in columns disposed along the length of the tape. The combinations of holes and the absence of holes, which represent combinations of binary bits, are, in each row, a representation of a character, as for example, a decimal digit.

In the prior art, the reading system for such punched tape comprises a light source which passes undirected light, i.e., diffused light, from the lamp filament through the punched holes of the moving tape. The light is then passed through holes of a mask prior to being sensed by the photocells. The masking arrangement is provided to minimize noise signals due to the diffused light. One photocell is provided for each channel position of the row and conducts to form an output signal only when a hole moves past the reading position. A disadvantage of this arrangement of the prior art is that it passes a large amount of light through the tape and through the hole in the mask onto the photocell when reading the absence of a hole as compared to the amount of light passed onto the photocell when reading the presence of a hole. Thus this arrangement gives a large noise signal, i.e., the signal out of the photocell due to undesired light passing through the tape material is large as compared to the output signal formed from the diffused light passed through a tape hole. Therefore, because of this small output signal to noise signal ratio, a small increase of the noise signal, caused by reading tape which is thin or of poor quality, may cause the noise signal to be interpreted as an output signal.

An object of the present invention is to provide an optical reading head for punched tape which utilizes lens arrangement to give a high degree of signal reading reliability.

Another object of this invention is to provide a punched tape reading head whereby the ratio of the output signal amplitude to the noise signal amplitude is of a large value.

Another object is to provide an optical reading head for punched tape which controls the light at the reading position so as to give a signal upon reading the presence of a punched hole which is easily differentiated from noise signals occurring during the absence of a punched hole at the reading position.

A further object of this invention is to provide an optical reading head which simultaneously reads each tape hole twice in order to check the reading of a signal.

Briefly, the punched tape reader of this invention comprises a lens arrangement which controls the light rays passing through tape holes to give a large output signal when reading the presence of a hole and a small noise signal when reading the absence of a hole or when a hole is not at the reading position. The light rays from the filament of a light source first pass through a collimating lens. The parallel rays so obtained are then passed into a plurality of condenser lenses. Each condenser lens directs and focuses the light as an image of the light source at one of the channel reading positions across the width of the tape. These images, which are smaller than the diameter of the tape holes so as to be unaffected by small variations of hole size, have a large luminous flux density, because of the focusing of the light. For each channel of the tape, where the images pass through tape holes, the rays of light pass through the input surfaces of one of a plurality of relay lenses and are then converged onto one of a plurality of photodiodes which, because of the large luminous flux density passed through the tape hole, forms a large output signal. When reading the absence of a hole in a channel, the light rays are diffused, i.e., deflected in many directions by the tape such that the relay lens, which has a small light acceptance angle, receives only a small amount of light rays from the source. Thus a noise signal of low amplitude is formed as compared to the output signal obtained by reading the presence of a hole. This results in a large output signal to noise signal ratio, which greatly improves the reliability of the readings. In one embodiment, a dual reading head arrangement is provided with the light source and the photodiodes arranged on opposite sides of the tape to simultaneously read the presence or absence of each hole twice, which readings are then compared to provide a check of the readings. In a second embodiment, the lens arrangement has the light source and photodiodes on the same side of the tape with a mirror on the opposite side. This arrangement greatly decreases the amplitude of the noise signal, since undesired light must pass through the tape material twice before being received by the photodiodes.

Further objects and advantages of the invention will be apparent to those skilled in the art from the following drawings and descriptions in which.

Figure 1:
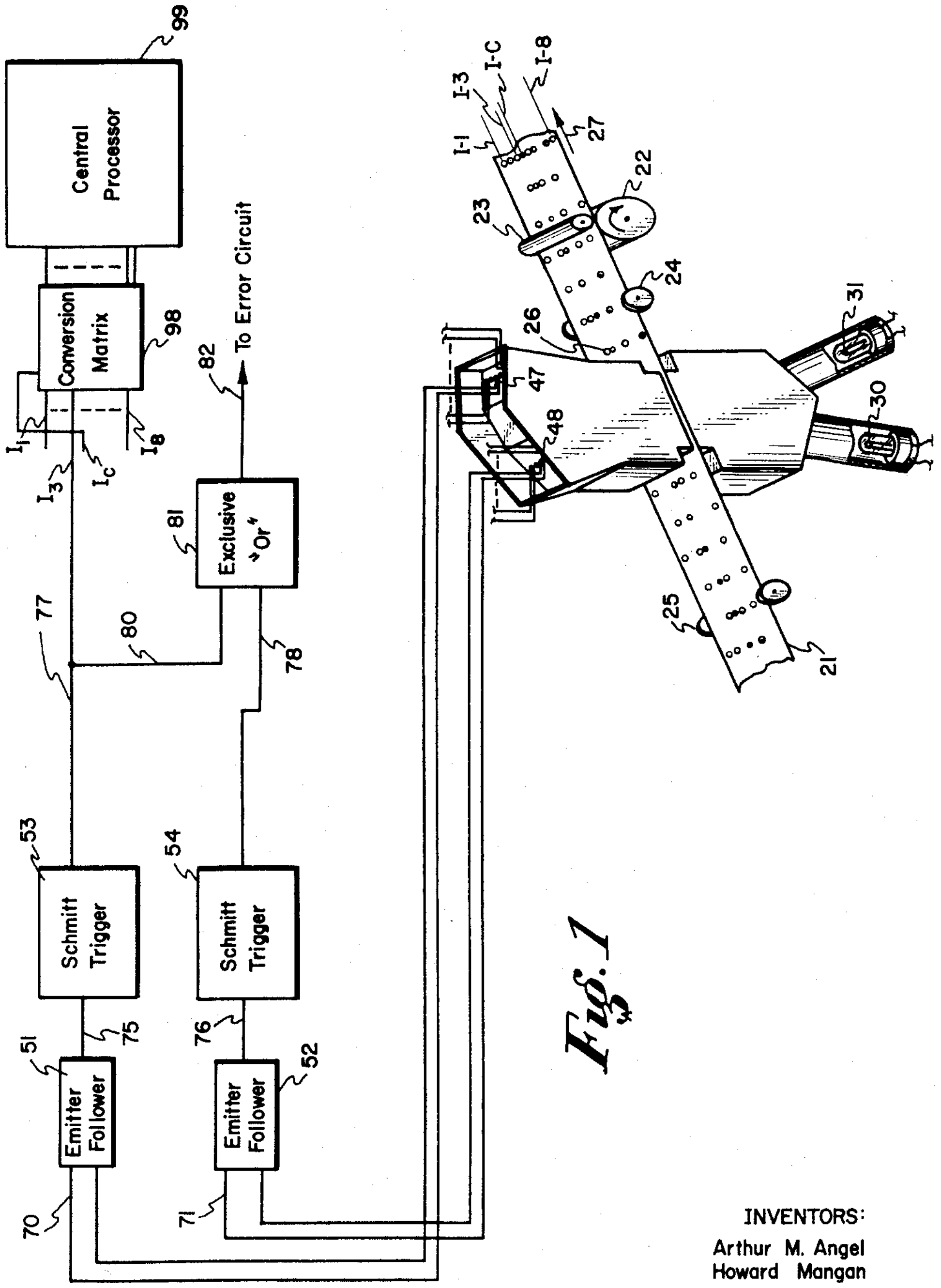
Fig. 1 is a perspective view of the preferred embodiment of the punched tape reading head with a block diagram of the signal forming and checking circuitry utilized in this invention.

Referring first to Fig. 1, a perspective view of the preferred embodiment of the punched tape reader with a block diagram of the signal forming and the checking circuitry of this invention is shown. The punched tape reader unit comprises two light sources, i.e., lamp filaments 30 and 31, which supply the light which is controlled to pass through the holes of tape 21 to photodiodes as 47 and 48, respectively, with a separate row of photodiodes for each light source. Tape 21 comprises nine hole positions or channels across its width, such as channels I–1 to I–8, inclusive, and I–C, as will be shown in detail later. The photodiodes, as 47 and 48, sense the presence or absence of tape holes, as hole 26, as the tape moves past the reading position. Tape 21 advances in the direction of arrow 27 as a result of capstan 22 rotating and pinch roller 23 holding tape 21 in contact with capstan 22. Guides 24 and 25 maintain the moving tape in a desired path relative to the reader unit. Rays of light from lamp filaments 30 and 31 which simultaneously pass through tape holes, as 26, cause photodiodes as 47 and 48, respectively, to be both energized and to form output signals indicating the presence of a hole, as will be explained subsequently. The two output signals generated by photodiodes 47 and 48 are fed via lines 70 and 71 to emitter followers 51 and 52, respectively. The path of the two output signals (Fig. 6) from emitter followers 51 and 52 will be explained subsequently.

Figure 2:
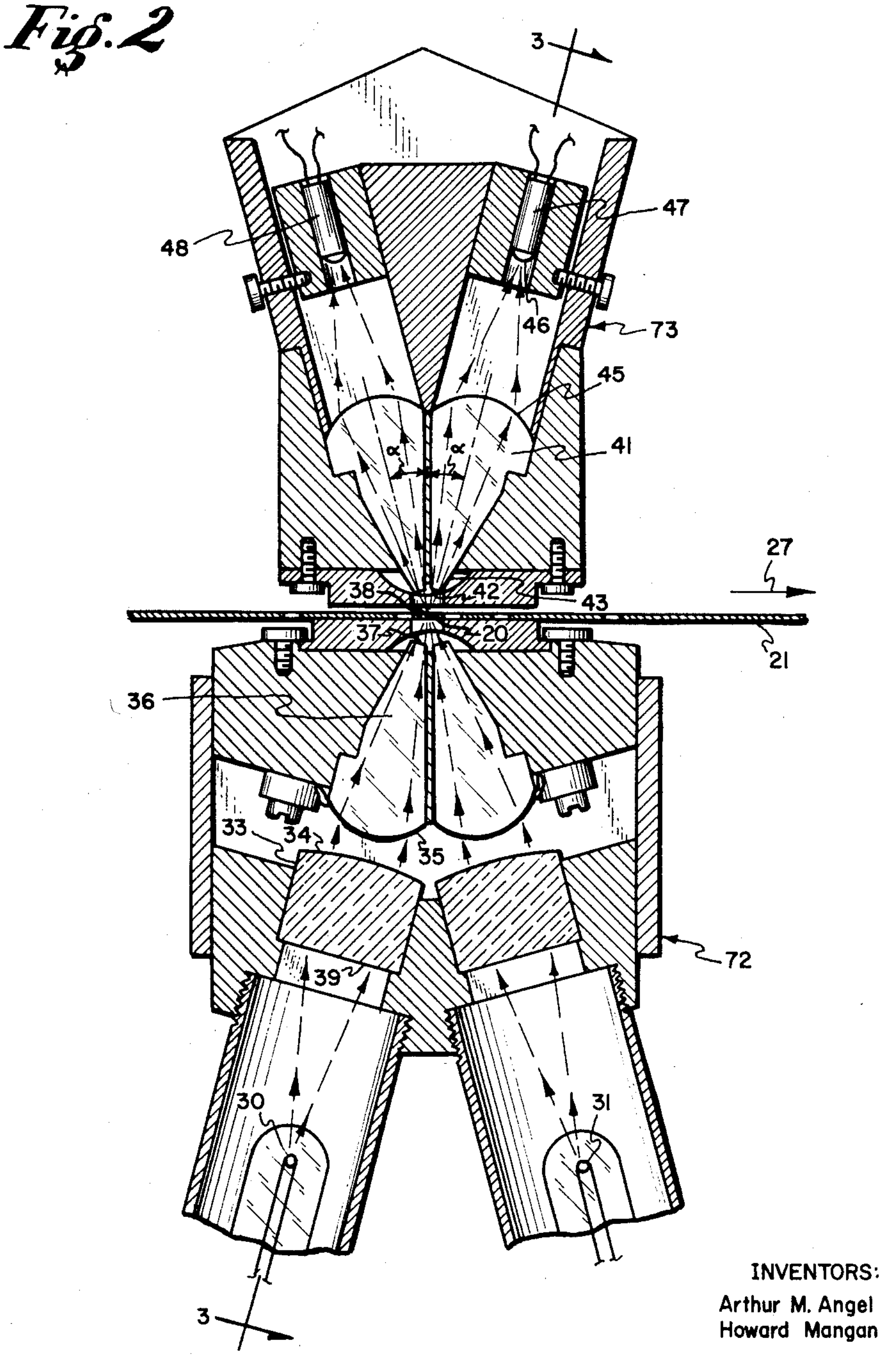
Fig. 2 is a sectional view taken through the light sources, tape and photodiodes of Fig. 1 to illustrate the light focusing arrangement.

Referring now to Fig. 2, a sectional view of Fig. 1 is shown to illustrate the light focusing and collimating arrangement of this invention. Two separate reading arrangements are provided each of which passes light simultaneously through the holes in tape 21. This light is controlled to pass through a hole in a direction at an angle $\alpha$ from a plane perpendicular to the surface of the tape. Thus each tape hole, as 20, is simultaneously read twice by light passing through the hole at two different angles. The angle $\alpha$ is equal to 15 degrees in the preferred embodiment of this invention. It is to be noted that passing light through each tape hole at two different angles provides a check against an erroneous reading caused, for example, by flat pieces of paper fiber in the holes as 20, which may obstruct passage of light in only one direction, or from partial failure of equipment as photodiode 47. Each of the reading arrangements is the same, and the lenses, such as 33, 36, and 41, are suitably mounted along the proper path and at the desired angle relative to the tape so as to control the light path. Thus the light filament 30 and lenses 33 and 36 are held in a lower mounting structure 72 and lens 41 and photodiode 46 are held in an upper mounting structure 73. The reading arrangement utilizing the lamp filament 30 supplies light rays to surface 39 of collimating lens 33. Lens 33 diverts these light rays such that they pass from its surface 34 as parallel rays of even intensity. Condenser lens 36 then receives these parallel rays of light at surface 35 thereof, and causes them to converge such that the light rays are focused so as to form an image 38 of the filament 30 in the plane of the tape. Condenser lens 36 is designed so that image 38 is a rectangular image of filament 30 focused to a size to give a large density of luminous flux, as will be explained subsequently. Relay lens 41 receives the diverging rays of light at surface 42 thereof, after these rays have passed through tape hole 20. As the diverging light rays pass through surface 45 of relay lens 41, these rays are deflected so as to converge at surface 46 of photodiode 47. Since the focused image 38 has a large density of luminous flux, photodiode 47 is changed to a conductive state to give a signal of large amplitude when reading the presence of a hole.

When tape 21 is advanced in direction 27 to a position in which the light does not pass through tape hole 20, as when reading the absence of a hole, or when light is striking tape 21 between holes, image 38, which is focused in the plane of tape 21, is now focused within tape 21. The surface of tape 21 causes some of the light to be reflected rather than to pass into tape 21. A large portion of that light which is not reflected or absorbed and which passes into the paper is diffused. However, only a portion of that light diffused by the paper is ever received by the small area of surface 42 on relay lens 41. This arises because the area of surface 42 presents a small angle of light reception. Thus it should be clear that only a small amount of the total light diffused by the paper and passed through the paper is received to change photodiode 37 into a conductive state. Therefore, only a small noise signal occurs when the photodiode is not sensing the presence of a hole in the tape. It is to be noted that the side surfaces 43 of relay lens 41 are coated with a black material such as paint to prevent light reception except at surface 42.

Figure 3:
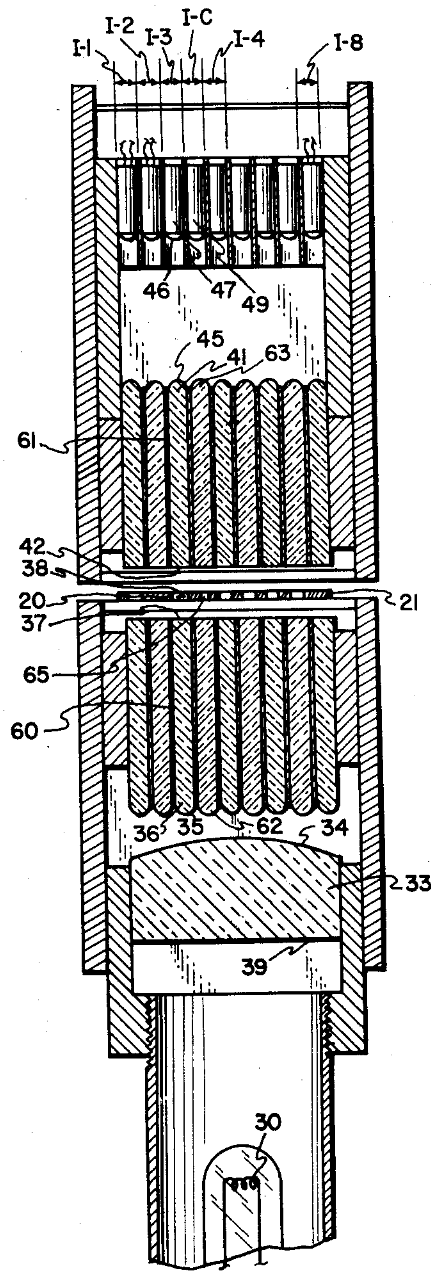
Fig. 3 is a sectional view taken on the line 3—3 of Fig. 2 to further illustrate the arrangement of the lenses.
Figures 4, 5, 6, 7:
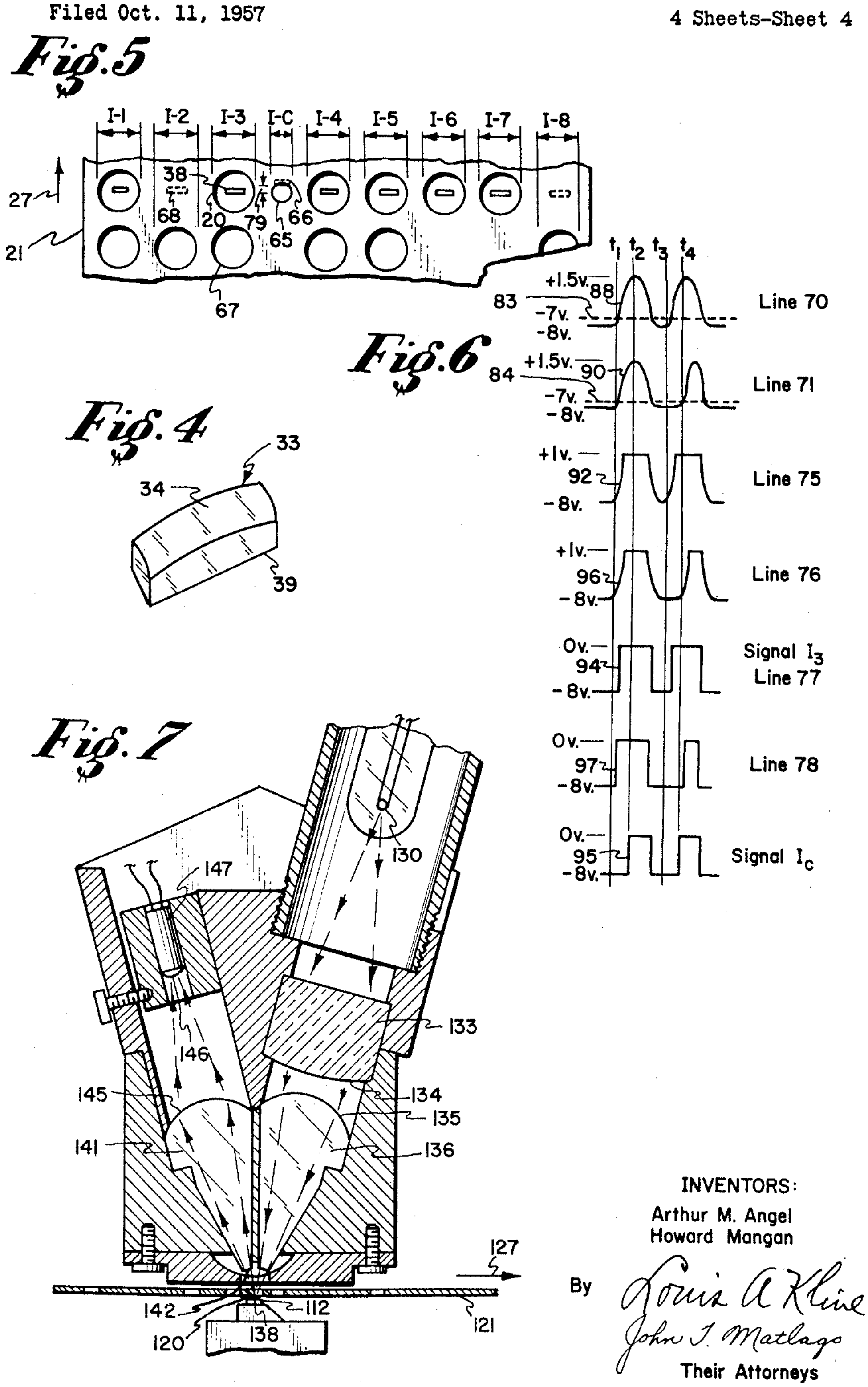
Fig. 4 is a perspective view to illustrate the shape of the collimating lens of Fig. 2.
Fig. 5 shows a portion of the tape illustrating the size of the focused images relative to the holes in the tape.
Fig. 6 is a schematic diagram of the waveforms to explain the operation of this invention.
Fig. 7 is a sectional view illustrating a second embodiment of the reading head.

Referring now to Fig. 3, a sectional view taken on line 3—3 of Fig. 2 is shown to further illustrate the arrangement of the lenses. Lamp filament 30 appears as a rectangular source of light to collimating lens 33. Referring also to Fig. 4 which shows a perspective view of collimating lens 33, the shape of this lens will be further explained. Surface 39 of this lens is flat while the opposite surface 34 thereof is convex shaped when looking at this latter surface from the outside of the lens. These surfaces are constructed so that light rays passing into surface 39 are converged upon passing out of surface 34 to form parallel rays, i.e., to be collimated. The collimated light strikes the surfaces of all nine condenser lens such as lens 36 with equal intensity. The light is then focused in the plane of tape 21 as shown by image 38. On both sides of each condenser lens as 36 is a light stop as 60 which prevents light rays from passing from one lens to another. After passing through the holes as 20 in tape 21, the light rays pass through surface 42 of relay lens 41. Each relay lens as 41 also has a light stop as 61 on both sides to prevent the passing of light from one lens to another. Surfaces as 45 of lens 41 are convex from the outside so as to focus the light rays on surface 46 of photodiode 47. Thus photodiode 47 reads the presence or absence of a hole in channel I–3 of tape 21 upon receiving the light rays from relay lens 41. It is to be noted that the particular condenser lens 62 forms the image in clock hole 65 of clock channel I–C from which the light rays pass to relay lens 63 and to photodiode 49 to form the clock signal, as will be explained subsequently.

Referring now to Fig. 5, a portion of the tape is presented to show the position of the focused images along a row of the tape. Tape 21 comprises hole positions or channels I–1 through I–8 and I–C. The presence or absence of holes in channels I–1 through I–8 at fixed distances along tape 21 represents combinations of binary bits, and the holes as 65 of channel I–C, which are aligned with the bit holes, as hole 20, are clock holes to form the clock signal. Hole 65 in channel I–C, is the tape sprocket hole and is made smaller in diameter than the holes as 20 in channels I–1 through I–8. Image 66 is of a smaller size than the diameter of clock hole 65, so that image 38, which is the same size as image 66 for similarity of lens design and assembly and for similarity of signal forming circuitry, is of much smaller size than bit hole 20. The small size of the image as 38 in the bit hole 20 decreases the light reception of a relay lens as 45 to an improperly directed light image meant for an adjacent relay lens as 63 (Fig. 3). Also, because of the size of images as 38 and 66, relative to the bit holes 20, small variations in hole size do not affect the signal intensity. Another requirement of image 38 is that it be of such a size that as tape 21 moves in direction 27, the image is completely blanked out by tape 21 between holes 20 and 67. Thus the output signal will return to a low voltage level between readings as will be explained subsequently. Condenser lens 62 as well as relay lens 63 (Fig. 3) are designed such that image 66 is focused at a location to pass through clock hole 65 to relay lens 63, as tape 21 moves in direction 27, after bit images as 38 are completely within the area of tape hole 20. It should be noted that image 66 is focused a distance 79 ahead of the images as 38 of the bit holes as hole 20 along the line of movement of tape 21 in the direction of arrow 27. The spacing of the image 66 is such that an output signal from light passing through a bit hole as 20 is of full amplitude before a clock signal is formed which, as will be explained, causes the output signal to be sampled. It is to be noted that dashed images, as image 68, illustrate the focused light in the plane of tape 21 where there are no tape holes.

Referring back to Fig. 1, and to Fig. 6 which shows the waveforms of the signals formed by the tape reader, the operation of the preferred embodiment of this invention will be further explained. When tape 21 advances such that a bit hole 20 (Fig. 5) moves to a position at which some of the image 38 is formed within the hole 20, the light rays start to pass to photodiodes 47 and 48, causing them to be in a conductive state. Thus, as shown in Fig. 6, at time $t_1$, signals start to appear on lines 70 and 71. As shown by waveforms 88 and 90, respectively, these signals reach their maximum level at time $t_2$. The signals from the photodiodes pass through emitter followers 51 and 52 to form signals on lines 75 and 76, respectively, as shown by waveforms 92 and 96. Waveforms 92 and 96 rise from −8 volts to +1 volt, for example, as determined by suitable arrangements of emitter followers 51 and 52. These signals on lines 75 and 76 of waveforms 92 and 96 pass into Schmitt trigger circuits 53 and 54 where they are shaped to form pulses on lines 77 and 78 as shown by waveforms 94 and 97, respectively, which rise from the logical voltage levels of −8 volts to 0 volts, for example. Thus two identical signals appear on lines 77 and 78 at time $t_2$. Line 77, which carries bit signal $I_3$ from reading channel I–3 (Fig. 5), connects to conversion matrix 98 as well as the lines for the other signals of bit signals $I_1$ through $I_8$. In conversion matrix 98, the code signals read from tape 21 are sampled when a clock gate is opened upon the occurrence of the clock signal $I_c$ of waveform 95 and are converted into suitable code signals to be passed to central processor 99. Clock signal $I_c$, as shown by waveform 95, does not rise until time $t_2$ because of the positioning of the clock image 66 (Fig. 5) relative to the images as 38 of the bit holes as 20. Therefore, the signals of waveform 94 are sampled only when the signals of waveforms 88 and 90 have reached their full amplitude, i.e., when the image is approximately at the center of the tape hole. Thus errors arising from holes as 20 (Fig. 5) being punched slightly out of position, tape 21 moving slightly out of alignment, and peripheral fibers in tape holes, as 20, are greatly eliminated.

As shown in Fig. 1, exclusive "or" circuit 81 is provided to check the signals on line 78 and on line 77 through line 80 by comparing the two readings. Circuit 81 forms a true or high voltage output signal only if its two inputs are different, indicating a difference in reading either a hole or absence of a hole in channel I–3 of tape 21. When the output of exclusive "or" circuit 81 is true, an error signal on line 82 passes to an error circuit (not shown), which will indicate an error to the central processor 99. Each channel, as I–3, has a similar exclusive "or" circuit as 81 to pass signals to the error circuit.

Returning to Fig. 6, potential levels 83 and 84, which are shown dashed, illustrate a possible shift of the general noise signal on lines 70 and 71, respectively, from −8 volts to −7 volts. This voltage level increase may be obtained from noise due to light leakage through poor quality tape or through thin tape and may occur between sampling times as at time $t_1$. It is to be noted that noise caused by incomplete blanking out of the signal between tape holes is eliminated by focusing the image as 38 (Fig. 5) to a desired size in this invention. Thus it can be seen that if the output signals represented by waveforms 88 and 90 were not of a large amplitude as compared to the +1 volt variation caused by noise, erroneous readings would occur.

To illustrate an error out of one of the dual reading arrangements, as from reading the presence of a tape hole which contains fibers to obstruct the light in only one direction, the signal on line 70 as shown by waveform 88 begins to rise from −8 volts at time $t_3$ because of light passing from filament 30 through the tape hole to photodiode 47. At this same time $t_3$, the signal on line 71 remains at the −8 volt level as shown by waveform 90 since no light has passed through the tape hole from filament 31 to photodiode 48 because of the abstruction in the tape hole in one direction. The signal on line 75 at time $t_4$ is shown by waveform 92 to be at +1 volt, while the signal $I_3$ on line 77 at time $t_4$ is shown by waveform 94 to be at the logical level of 0 volt. However, the signal on line 76 as shown by waveform 96 does not rise in potential from −8 volts to +1 volt until after time $t_4$. Also, the signal on line 78 at time $t_4$ as shown by waveform 97 does not rise above −8 volts until after time $t_4$. Thus the error circuit (not shown), which responds to an error signal on line 82 at the same time that the clock signal $I_c$ rises to sample the output signals, passes an error signal to central processor 99, indicating a difference of the two signals passed into exclusive "or" circuit 81.

Referring now to Fig. 7, a sectional view is shown through the lens and photodiode arrangement to illustrate another embodiment of this invention. This embodiment comprises a filament 130, a lens arrangement and photodiodes as 147, all on one side of tape 121, with a mirror 112 mounted on the opposite side of tape 121 to reflect the light rays passed through tape holes as 120. This embodiment comprises a single reading arrangement rather than the double arrangement of the preferred embodiment. Light rays from filament 130 pass into collimating lens 133 and then pass from surface 134 of collimating lens 133 to surfaces as 135 of a plurality of condenser lenses as lens 136. The light rays are then converged so as to focus as image 138 on mirror 112 after passing through tape hole 120. The light rays are then reflected from mirror 112 back through hole 120 to surfaces as 142 of a relay lens as 141. The light rays then pass through surface 145 and are converged onto surface 146 of photodiode 147. The focusing of image 138 near the plane of tape 121 to a size to pass through hole 120 results in a large concentration of luminous flux passing through hole 120 and thus a large output signal, as in the preferred embodiment. It is to be noted that the action of the lenses and the size of the images as 138 are similar to those of the preferred embodiment.

When reading the absence of a hole, any light passed from surface 137 must, in order to reflect from mirror 112 to surface 142, pass through tape 121 twice. Each time the light rays pass through the material of tape 121, light is absorbed, reflected and diffused. Thus the noise signal from reading the absence of a hole, or when a hole is not in the reading position at mirror 112, is very small as compared to an output signal since light to form the noise signal must pass through the tape material twice. Therefore, the second embodiment of this invention gives a large signal to noise ratio, resulting in reliability of readings.

It will be evident that in view of the present disclosure, modifications and changes will occur to those skilled in the art and accordingly it is not desired to limit the invention to the specific details of the exemplary illustrated embodiments other than as defined in the appended claims.

What is claimed is:

1. Apparatus for reading holes in a record tape as the tape advances past a fixed reading position comprising: a source of light rays; a collimating lens to collect and to deflect the light rays such that they are parallel to each other; a plurality of condenser lenses, each focusing some of the light rays to form an image of the light source of a size smaller than said tape holes and smaller than the spacing between successive tape holes; a plurality of relay lenses, each having a receiving surface sized to receive only those light rays passed through a hole from a respective one of said condenser lenses; and signal forming means responsive to the light rays received from said relay lenses.

2. Apparatus for simultaneously reading the presence or absence of holes in channel positions located across the width of a record tape comprising: a source of light;

a collimating lens to direct the light from said source; a plurality of condenser lenses, respective ones for focusing light from said collimating lens to form images of the source on respective ones of the channel positions of the tape, each of said images having a size smaller than a hole in the tape and smaller in longitudinal dimension than the longitudinal spacing between holes; a plurality of relay lenses, respective ones for receiving and directing the light passed through the holes in respective ones of the channel positions; and signal forming means responsive to the light passing out of the relay lenses.

3. Apparatus for sensing the presence or absence of openings in punched tape comprising: a source of light; a collimating lens to collect and to deflect the light from said source into parallel rays; a plurality of condenser lenses, respective ones to focus light from said collimating lens into images in the plane of the tape and in respective rows of individual openings provided across the width of said tape, said images being smaller than said openings and less of a longitudinal dimension than the smallest longitudinal spacing of said openings; a reflector located on the side of said tape opposite said plurality of condenser lenses to reflect the light of said images back through said openings; a plurality of relay lenses, respective ones to receive the light from respective condenser lenses reflected from said reflector; and a plurality of light sensitive elements, respective ones to respond to the light from respective ones of said plurality of relay lenses.

4. Apparatus for simultaneously reading the presence of openings in rows of a punched tape comprising: a first and a second source of light; a first and a second collimating lens to direct the light from said first and second sources, respectively, into respective first and second beams of parallel rays; a first and a second plurality of condenser lenses to focus with a high density of luminous flux the light rays from said first and second collimating lenses, respectively, such that respective pairs of the images of the light sources produced by the light rays coincide in the openings in respective rows of the tape, said images being smaller than said openings and having longitudinal dimensions less than the smallest longitudinal spacing of said openings; a first and a second plurality of relay lenses to receive and direct the light rays passed through said tape openings from said first and second plurality of condenser lenses, respectively; and a first and a second plurality of light sensing means responsive to light directed from said first and second pluralities of relay lenses, respectively, to form output signals.

5. Apparatus for reading the presence of holes in rows of a punched tape comprising: a first and a second source of light; a first and a second collimating lens to direct the light from said first and second sources, respectively, into respective first and second beams of parallel rays; a first and a second plurality of condenser lenses to focus with a high density of luminous flux the light rays from said first and second collimating lenses, respectively, such that respective pairs of images produced by the light rays coincide in the plane of the tape in respective rows, said images being smaller than said holes and having longitudinal dimensions less than the smallest longitudinal spacing of said holes; a first and a second plurality of relay lenses to receive and direct the light rays passed through said tape holes from said first and second plurality of condenser lenses, respectively; a first and a second plurality of light sensing means responsive to light directed from said first and second pluralities of relay lenses, respectively, to form respective pairs of output signals; and means to compare the members of respective pairs of said output signals.

6. Apparatus for reading holes in a plurality of rows across the width of a record tape as the tape advances past a fixed reading position, said apparatus comprising: a source of light rays; light collimating means disposed so as to collect and to deflect a substantial portion of said light rays so that they are parallel to each other upon emerging from said means; a plurality of photically isolated light condenser means disposed so as to collect and focus said parallel rays to form images of the light source in the plane of said tape and in respective rows, said images being smaller than said holes and having longitudinal dimensions less than the smallest longitudinal spacing of said holes; a plurality of photically isolated light relay means disposed on the side of said tape opposite to said light source, respective ones being oppositely disposed to respective ones of said light condenser means, and each having a receiving surface sized to receive only those light rays passed through a hole from the corresponding light condenser means, said light condenser means and said light relay means being so disposed as to have the exit surfaces of the former and the receiving surfaces of the latter close to said tape to thereby aid in minimizing the effects of stray light; and a plurality of signal-forming means, respective ones being disposed so as to receive and to be responsive to the light rays emerging from respective ones of said light relay means.

7. Apparatus for reading the presence of openings in a plurality of channels located across the width of a punched tape comprising: first and second sources of light; first and second light collimating means disposed so as to collect and direct light from said first and second sources, respectively, so as to form respective first and second beams of parallel light; first and second pluralities of photically isolated light condenser means, respective means of said first plurality being disposed so as to collect and focus light from said first beam so as to form respective images of said source in the plane of said tape and in respective ones of said channels, said images being smaller than said openings and having longitudinal dimensions less than the longitudinal spacing of said holes, said second plurality of light condenser means being similarly disposed to collect and focus light from said second beam so as to similarly produce similar images in the plane of said tape and in respective ones of said channels, respective images of said first plurality substantially coinciding with respective images of said second plurality; first and second pluralities of photically isolated light relay means disposed on the side of said tape opposite to said sources, respective light relay means of said first plurality being disposed so as to receive and direct light passed through said openings from respective ones of said first plurality of light condenser means, respective light relay means of said second plurality being similarly disposed to receive and direct light passed through said holes from respective ones of said second plurality of light condenser means, said light condenser means and said light relay means being so disposed as to have the exit surfaces of the form and the receiving surfaces of the latter close to said tape to thereby aid in minimizing the effects of stray light; and a plurality of light-sensing means, respective means being disposed to receive and respond to light from respective ones of said first and second pluralities of light relay means.

References Cited in the file of this patent

UNITED STATES PATENTS

| | | |
|---|---|---|
| 2,482,039 | Thompson | Sept. 13, 1949 |
| 2,493,519 | Baltosser | Jan. 3, 1950 |
| 2,605,965 | Shepherd | Aug. 5, 1952 |
| 2,611,097 | Stanley et al. | Sept. 16, 1952 |
| 2,732,504 | Steele | Jan. 24, 1956 |